(12) United States Patent
Brooks et al.

(10) Patent No.: US 7,680,763 B2
(45) Date of Patent: Mar. 16, 2010

(54) ADMINISTRATION OF RESOURCES IN SYSTEM-WIDE SEARCH SYSTEMS

(75) Inventors: David Andrew Brooks, Providence, RI (US); Laurent Hasson, New York, NY (US); David Konopnicki, Haifa (IL)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 11/313,353

(22) Filed: Dec. 21, 2005

(65) Prior Publication Data

US 2007/0143251 A1 Jun. 21, 2007

(51) Int. Cl.
*G06F 17/30* (2006.01)
(52) U.S. Cl. ............... 707/2; 707/3; 707/4; 707/201
(58) Field of Classification Search ............ 707/2, 707/3, 4; 718/104; 705/1
See application file for complete search history.

(56) References Cited

U.S. PATENT DOCUMENTS

| | | | | |
|---|---|---|---|---|
| 5,325,525 A * | 6/1994 | Shan et al. | | 718/104 |
| 5,701,473 A * | 12/1997 | Braseth et al. | | 707/205 |
| 6,085,216 A * | 7/2000 | Huberman et al. | | 718/104 |
| 6,345,279 B1 * | 2/2002 | Li et al. | | 707/104.1 |
| 6,353,518 B2 * | 3/2002 | Pinarbasi | | 360/324.11 |
| 6,519,615 B1 * | 2/2003 | Wollrath et al. | | 707/206 |
| 6,601,064 B1 * | 7/2003 | Nag et al. | | 707/4 |
| 6,732,084 B1 * | 5/2004 | Kabra et al. | | 707/2 |
| 6,738,756 B1 * | 5/2004 | Brown et al. | | 707/2 |
| 6,944,614 B1 * | 9/2005 | Ramasamy et al. | | 707/4 |
| 7,231,383 B2 * | 6/2007 | Andreev et al. | | 707/3 |
| 2002/0006266 A1 * | 1/2002 | Yoon et al. | | 386/69 |
| 2002/0023144 A1 * | 2/2002 | Linyard et al. | | 709/218 |
| 2003/0097443 A1 * | 5/2003 | Gillett et al. | | 709/225 |
| 2004/0199491 A1 * | 10/2004 | Bhatt | | 707/2 |
| 2005/0234848 A1 * | 10/2005 | Lawrence et al. | | 707/1 |
| 2005/0234875 A1 * | 10/2005 | Auerbach et al. | | 707/3 |
| 2005/0278288 A1 * | 12/2005 | Plow et al. | | 707/1 |
| 2007/0143262 A1 * | 6/2007 | Kasperski | | 707/3 |

* cited by examiner

*Primary Examiner*—Don Wong
*Assistant Examiner*—Binh V Ho

(57) ABSTRACT

A method and system for administration of a search system (310) for searching data from a plurality of applications. The method includes defining the requirements of a plurality of applications (301-303) to send data to the search system (310), and using optimization techniques (312) to adapt the resources (420) of the search system to meet the requirements. Resources (420) are allocated and de-allocated to the search system (310) in response to the outcome of the optimization. Policies (415) regarding resource consumption can be defined at predetermined times or in predetermined circumstances to enable dynamic resource allocation.

10 Claims, 11 Drawing Sheets

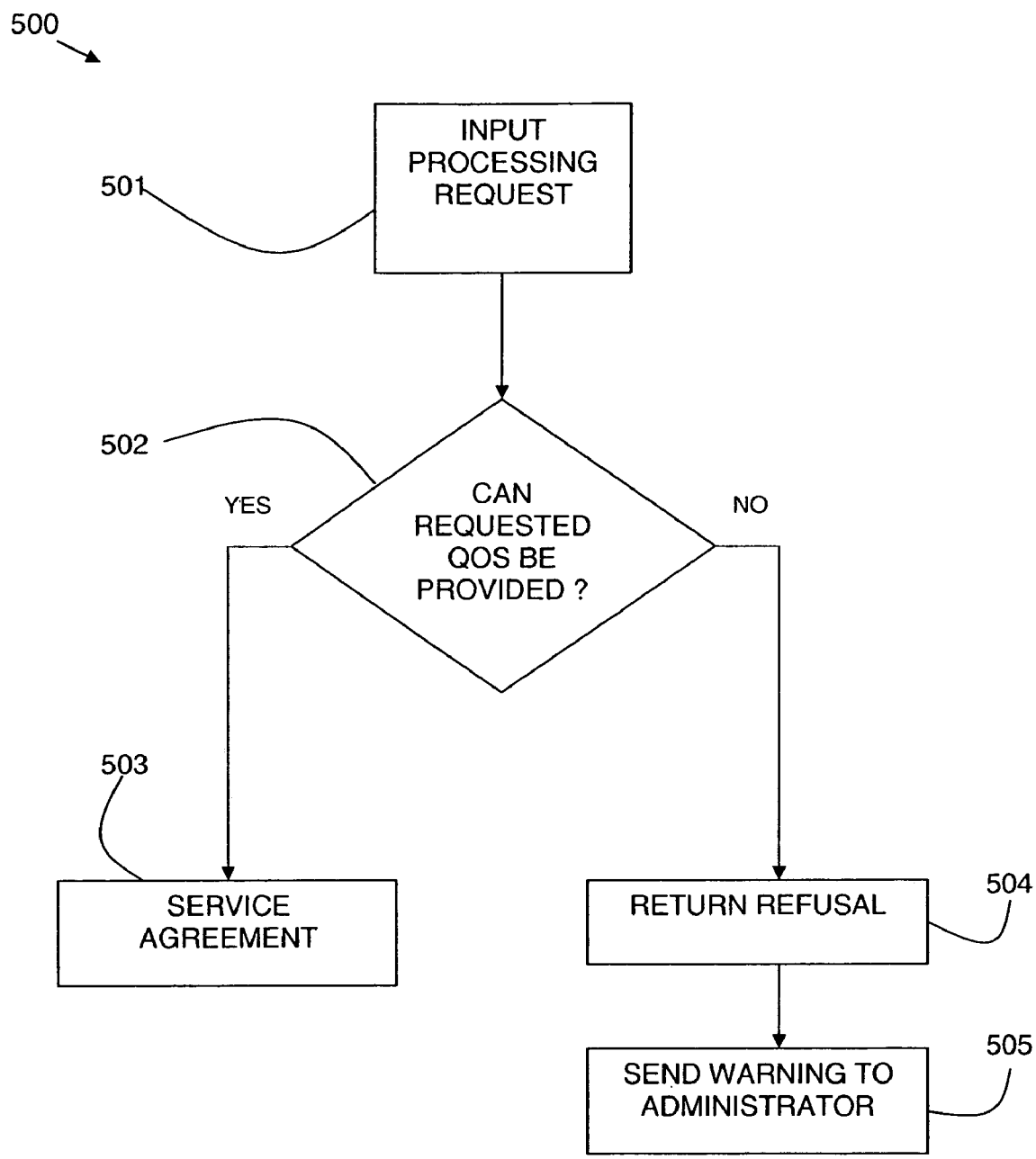

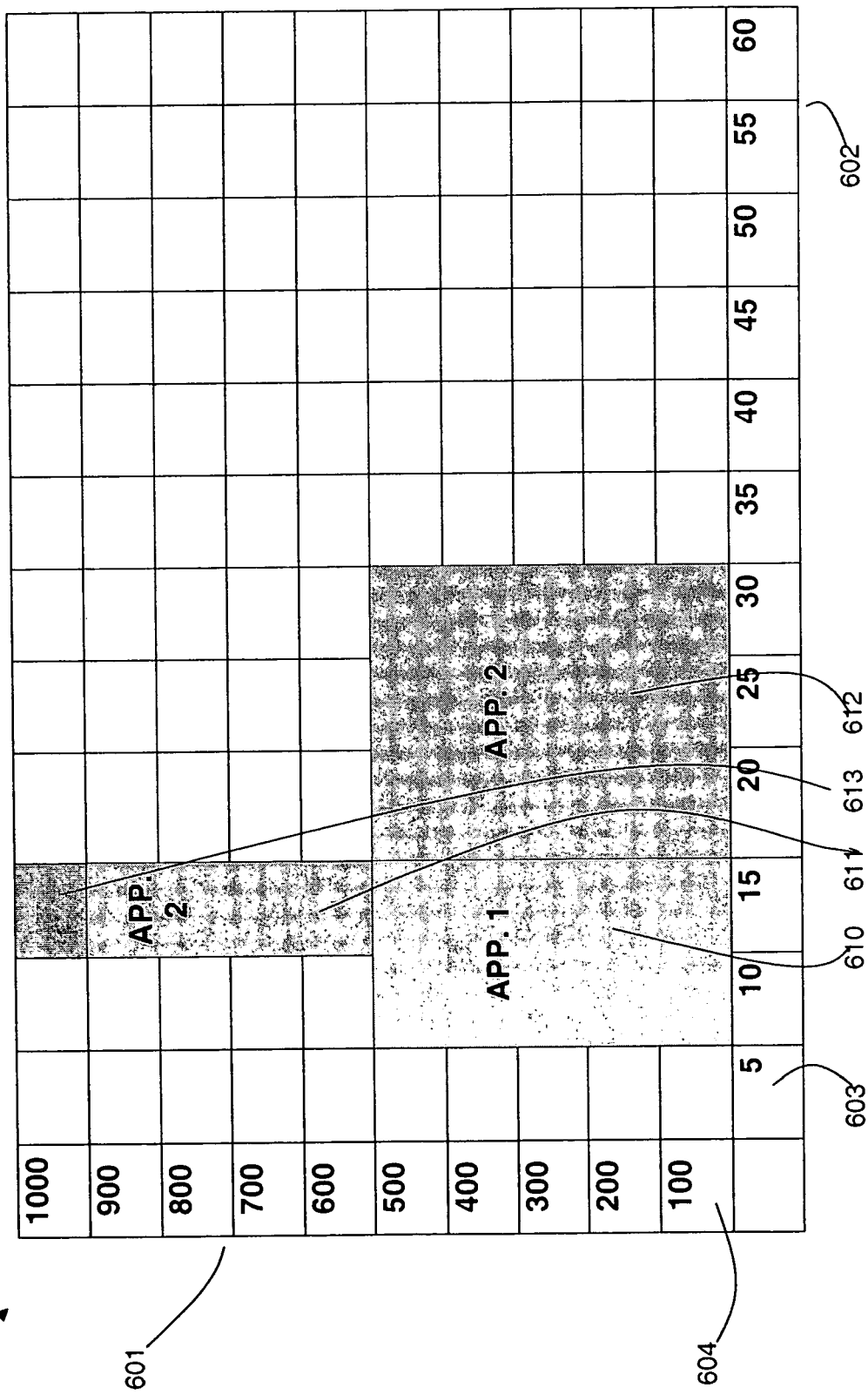

ADMINISTRATION OF RESOURCES IN SYSTEM-WIDE SEARCH SYSTEMS

FIELD OF THE INVENTION

This invention relates to the field of system-wide search systems. In particular, the invention relates to administration of resources of a search system for searching data from multiple applications.

BACKGROUND OF THE INVENTION

In the past, individual applications have implemented search features independently. For example, a search in email, a search in a file system, a search in code files, etc. The search system is becoming a system-level service that different applications can use to store their data and make it searchable. Search indexes are becoming foundation services provided on a desktop, as part of the operating system of personal computers, or enterprise servers.

A specialized search facility can be provided on a desktop of a personal computer. An example is Google Desktop Search (trade mark of Google Inc.) which provides searches and access to information on a personal computer. It is a desktop search application that provides full text search over email, instant messages, computer files, media files and documents such as music, video and photos, and web pages that have been viewed.

System-wide search engines can also be provided as part of an operating system of a computer. For example, Spotlight in Mac OS X v10.4 Tiger (Spotlight, Mac and Tiger are trade marks of Apple Computer Inc.) and Longhorn (trade mark of Microsoft Corporation) provide search facilities as part of their operating systems in which applications and documents can be searched.

Applications running on such systems do not implement their search features independently, as done in the past but, instead, index their data as part of the system-wide index. For example, an instant messaging application that wants to provide a searchable history of messages does not need to implement this feature but must push the messages to the global index provided by the operating system or by the specialized search service. In order to do so, providers of search technology publish APIs that allow applications to push their data into their index (e.g., Google Desktop Search API).

This approach poses the problem of several applications pushing updates to the search index concurrently and competing for resources. These different applications may have different policies regarding the speed at which their updates must appear in the index. For example, an email application may need every message to be indexed as soon as it arrives (a few seconds) while a file system search application may support a lag of a few minutes (and even more for very large file systems). Furthermore, not knowing the expectations of the applications that push data in the index, the search index itself cannot allocate resources ahead of time in order to satisfy those expectations.

SUMMARY OF THE INVENTION

According to a first aspect of the present invention there is provided a method for administration of a search system for searching data from a plurality of applications, the method comprising: defining the requirements of a plurality of applications to send data to the search system; and using optimization techniques to adapt the resources of the search system to meet the requirements.

According to a second aspect of the present invention there is provided a computer program product stored on a computer readable storage medium, comprising computer readable program code means for performing the steps of: defining the requirements of a plurality of applications to send data to the search system; and using optimization techniques to adapt the resources of the search system to meet the requirements.

According to a third aspect of the present invention there is provided a search system for searching data from a plurality of applications, the system comprising: a resource optimizer including: definitions of requirements of a plurality of applications to send data to the search system; optimizer means for adapting the resources of the search system to meet the requirements; and means to allocate or de-allocate resources to the search system.

According to a fourth aspect of the present invention there is provided a method of providing a service to a customer over a network, the service comprising: hosting a search service including: defining the requirements of a plurality of clients to send data to a search system; and using optimization techniques to adapt the resources of the search system to meet the requirements.

An embodiment of the invention enables the dynamic administration of resources in a search system for searching data from multiple applications. When an application intends to push data into a search index of a search system, it first sends a service request including details of the data requirements. For example, the data requirements may include details of the priority, rate and size of update, acceptable lag time, etc. The search system can adapt dynamically to the different applications pushing data into the index, providing enough resources so that their quality requirements are met.

A quality of service (QOS) contract is proposed between an administrator and the search system. The defined QOS is different from search system configuration in that it is a form of contract between the search system and an administrator. The system commits to meet a certain level of service and must manage its resources in order to do so. If that level cannot be met, the administrator is told of what changes should be done (to hardware and/or software) in order to meet the required level of service. This contract is usually called a SLA (service level agreement).

Known QOS is usually implemented by allocating system resources (memory buffers, CPU time slots, network bandwidth, etc.) according to applications' requests. However, usually QOS is used to provide guaranteed performance/latency/throughput for networking applications influencing how data is serviced. In the case of a search system, the subject of the QOS is how data is maintained in the search index, for example, providing guaranties about index data freshness, outdated data expiration, recrawl, and new data made searchable.

BRIEF DESCRIPTION OF THE DRAWINGS

The subject matter regarded as the invention is particularly pointed out and distinctly claimed in the concluding portion of the specification. The invention, both as to organization and method of operation, together with objects, features, and advantages thereof, may best be understood by reference to the following detailed description when read with the accompanying drawings in which:

FIG. 5A is a flow diagram of a method of operation of a system-wide search engine in accordance with the present invention;

FIGS. 6A to 6E are diagrams showing the allocation of search index resources in accordance with the present invention.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numbers may be repeated among the figures to indicate corresponding or analogous features.

DETAILED DESCRIPTION OF THE INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Figure 1:
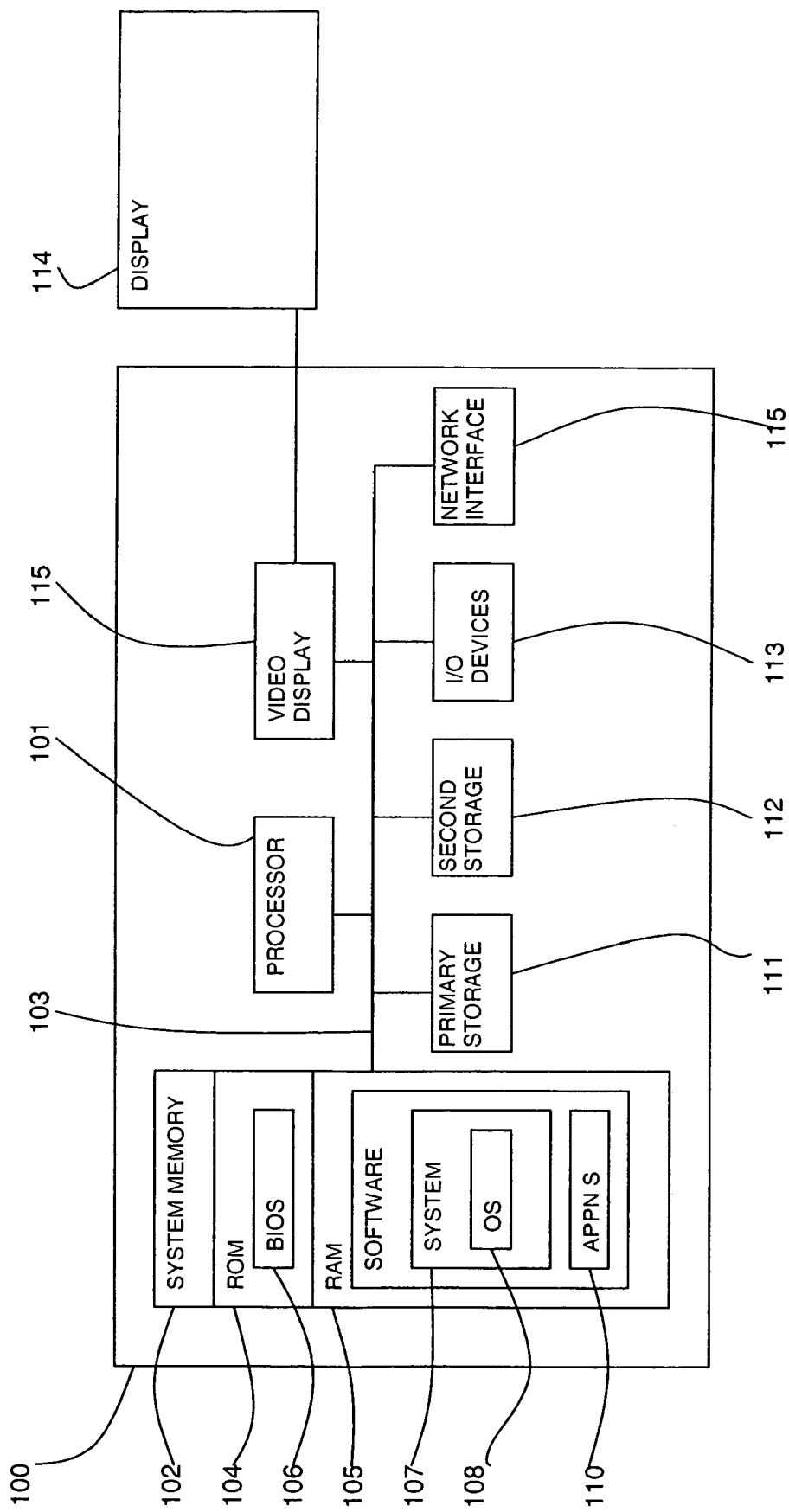
FIG. 1 is a block diagram of a computer system in which the present invention may be implemented.

Referring to FIG. 1, an exemplary system for implementing the invention includes a data processing system 100 suitable for storing and/or executing program code including at least one processor 101 coupled directly or indirectly to memory elements through a bus system 103. The memory elements can include local memory employed during actual execution of the program code, bulk storage, and cache memories which provide temporary storage of at least some program code in order to reduce the number of times code must be retrieved from bulk storage during execution.

The memory elements may include system memory 102 in the form of read only memory (ROM) 104 and random access memory (RAM) 105. A basic input/output system (BIOS) 106 may be stored in ROM 104. System software 107 may be stored in RAM 105 including operating system software 108. Software applications 110 may also be stored in RAM 105.

The system 100 may also include a primary storage means 111 such as a magnetic hard disk drive and secondary storage means 112 such as a magnetic disc drive and an optical disc drive. The drives and their associated computer-readable media provide non-volatile storage of computer-executable instructions, data structures, program modules and other data for the system 100. Software applications may be stored on the primary and secondary storage means 111, 112 as well as the system memory 102.

The computing system 100 may operate in a networked environment using logical connections to one or more remote computers via a network adapter 116.

Input/output devices 113 can be coupled to the system either directly or through intervening I/O controllers. A user may enter commands and information into the system 100 through input devices such as a keyboard, pointing device, or other input devices (for example, microphone, joy stick, game pad, satellite dish, scanner, or the like). Output devices may include speakers, printers, etc. A display device 114 is also connected to system bus 103 via an interface, such as video adapter 115.

Figure 2:
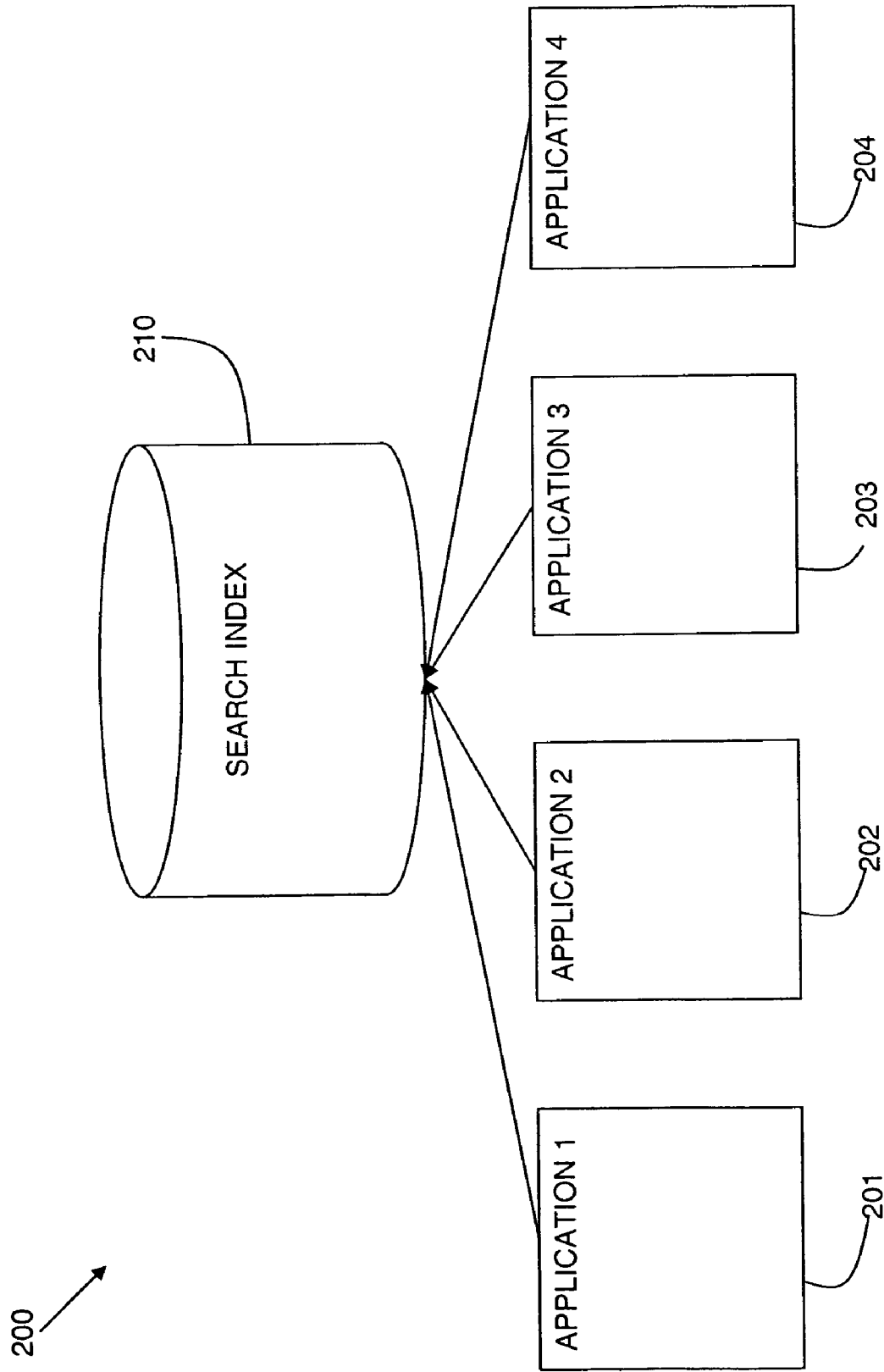
FIG. 2 is a block diagram of system-wide search system as known in the art.

Referring to FIG. 2, a block diagram shows a computer system 200 with a system-level search index 210 as known in the prior art. A plurality of applications 201-204 share the search index 210. The search index 210 has a published indexing API allowing the applications 201-204 to index their data in the search index 210.

The applications 201-204 each have different requirements and expectations with respect to the searchability of their data. The first application 201 may be in the form of a file system which has lots of updates but whose indexed data can be outdated. The second application 202 may be in the form of an email application which has few updates but whose updates must be searchable immediately. A third application 203 may regularly have a set amount of data to index (for example, at the same time each day).

Figure 3:
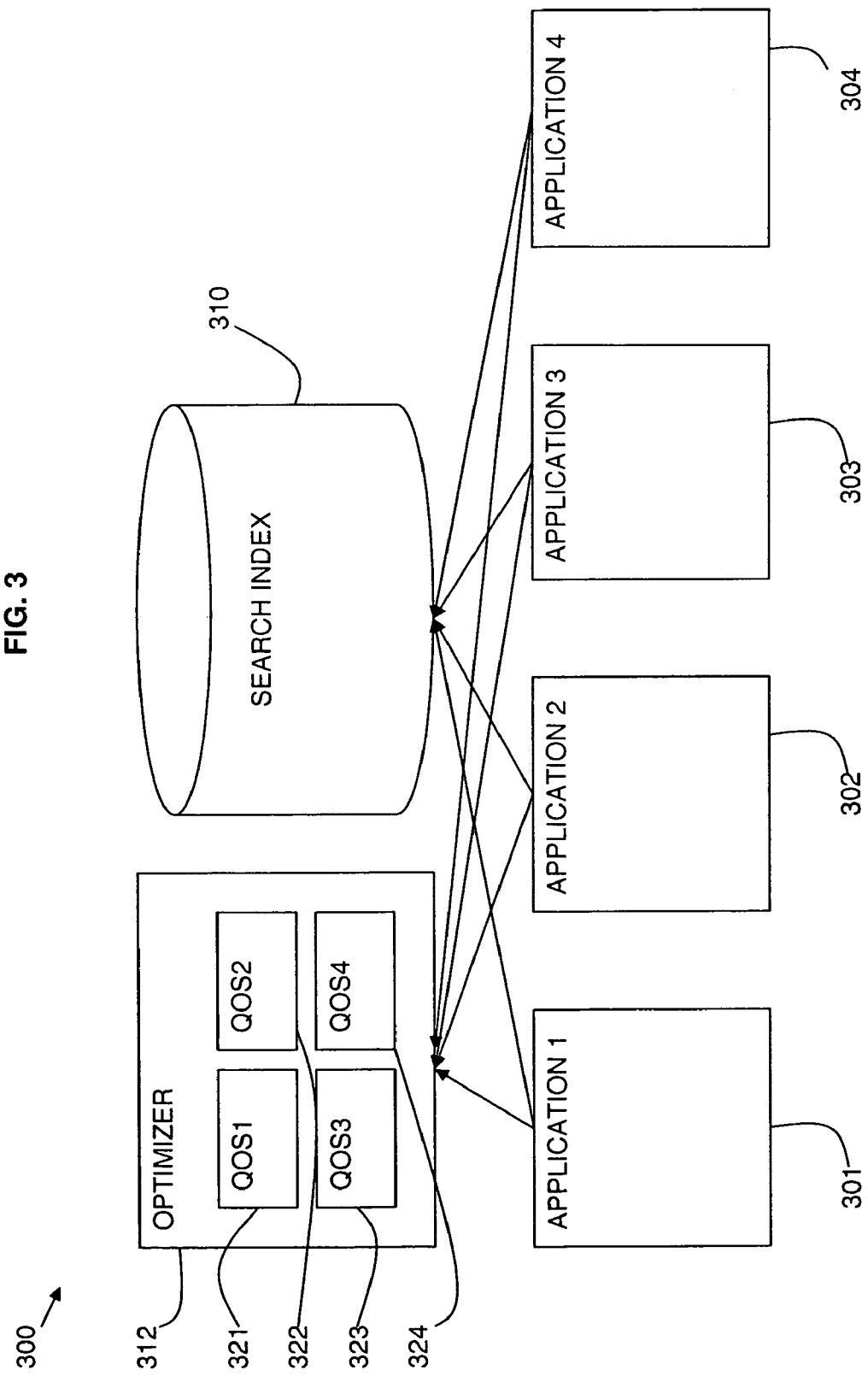
FIG. 3 is a block diagram of a system-wide search system in accordance with the present invention.

Referring to FIG. 3, a block diagram shows a computer system 300 as a representation of an embodiment of the present invention in which a system-level index 310 is used in cooperation with an optimizer 312. A plurality of applications 301-304 share the search index 310 as in FIG. 2. However, the plurality of applications 301-304 each have specified requirements in the form of a quality of service agreement 321-324 with the search index 310. The optimizer 312 uses optimization technology to ensure that the search index 310 carries out the indexing of the data from the applications 301-304 according to the specified requirements of the applications 301-304. Relevant technologies for optimization include queuing theory, linear programming, task scheduling, etc.

Figure 4:
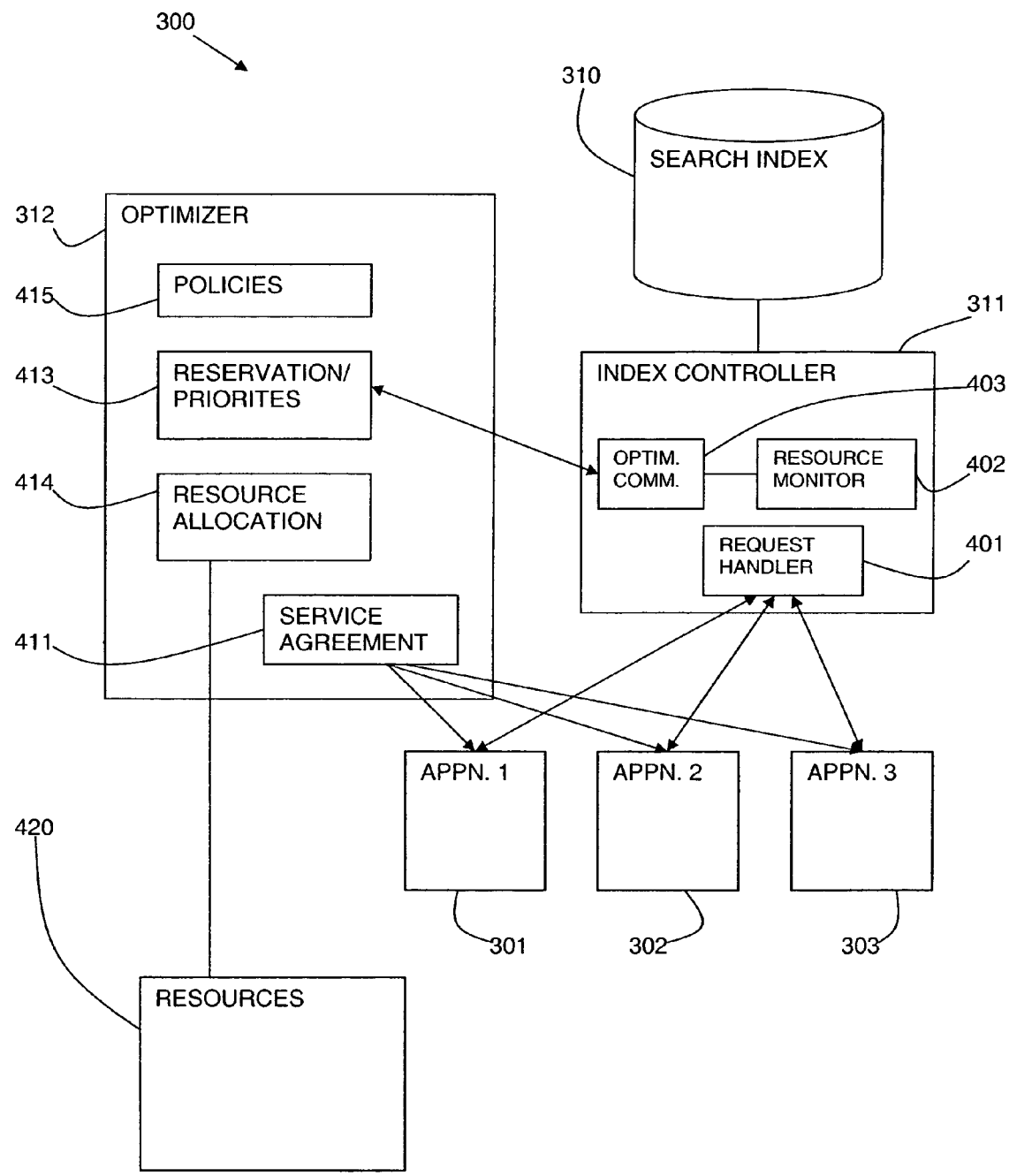
FIG. 4 is a block diagram showing further details of a system-wide search system in accordance with the present invention.

Referring to FIG. 4, a more detailed diagram is provided of the computer system 310 as shown in FIG. 3.

The search index 310 has an associated index controller 311. The index controller 311 is shown coupled to the search index 310 in the schematic diagram of FIG. 4 together forming a search system. The index controller 311 may be integral with the search index 310, may be coupled to it, or may be implemented as part of the optimizer 312.

The index controller 311 includes a request handler 401 which receives and responds to the requests from applications 301-303. The index controller 311 also includes an index resource monitor 402 to determine the resources of the index available for requests. The index controller 311 also includes optimizer communication 403 for receiving and sending information between the optimizer 312 and the search index 310. The optimizer communication 403 allows the index controller 311 to receive and apply defined policies for resource consumption from the optimizer 312 and to send information regarding resource availability to the optimizer 312.

When the request of an application 301-303 can be fulfilled, the optimizer 312 generates a service agreement 411 with the search index 310 including quality of service requirements of the application 301-303 and sends it to the application 301-303. The service agreement 411 is like a digital contract between the search index 310 and the application 301-303 that specifies what quality of service the application 301-303 is going to receive.

The optimizer 312 applies optimization technology to generate and, then, to meet the service agreement requirements. The optimizer 312 includes means for reserving and prioritizing the resources of the search index 310 to handle the application requests. The optimizer 312 also includes means 414 for allocating/de-allocating resources 420 to the search index 310 when required to handle the application requests. The optimizer 312 may include predefined policies 415 for resource allocation based on the quality of service requirements such that the resource consumption can by dynamically changed without administrative intervention.

The request of an application 301-303 is sent when an application 301-303 wishes to push data into the search index 310. The request is sent by the application 301-303 to the index controller 311, acting for the search index 310. The request includes information about the requirements of the application 301-303. For example, in one embodiment the request may include:

The relative priority of the request in the system.
The rate of updates the applications intends to send.
The average size of the updates and their types (file types).
The maximum acceptable time lag between the post of an update and its appearance in the index.

Given the request, the index controller 311 can verify if the search index 310 has enough resources to provide the requested quality of service. This is done by communicating with the optimizer 312. The optimizer 312, using the resource monitor 402, given the resource allocation 414, the reservation priorities 413, and the policies 415 checks if the request can be fulfilled. If the request can be met, this will result in a service agreement 411 being returned to the requesting application 301-303. If the request cannot be met, the index controller 311 can do one of the following:

Propose a counter proposal that the search index 310 can fulfil.
Send a warning message to the person that administers the search system, requesting the allocation of new resources (CPU time, disk space etc.)
Deny the request.

Given the expected quality of service of the different applications, it is possible for the index controller 311 to send warning or error messages to the person who administers the system if the quality of service requested by an application 301-303 cannot be fulfilled. Messages to the administrating person may be for example:

Email system: Indexing of mail messages lags three hours (expected indexing lag: 10 minutes).
File System: Not enough disk space to index file system.

The search index 310 allows the person that administers the system to define policies 415 for resource consumption based on the quality of service requirements, time of day, user load, etc. If the expected quality of service can be met with x number of resources, then increasing resource consumption to process faster is not necessary. Without administrative intervention, resource consumption can be dynamically increased/decreased based on predefined rules.

Referring to FIG. 5A, a flow diagram 500 is provided showing the process of the index controller of the search system. An input 501 is made as a processing request from an application. It is determined 502 if the requested quality of service can be provided. If it can be provided, a service agreement 503 for the request is returned to the application. If it can not be provided, a refusal 504 is returned to the application and a warning 505 is sent to the administrator.

Figure 5B:
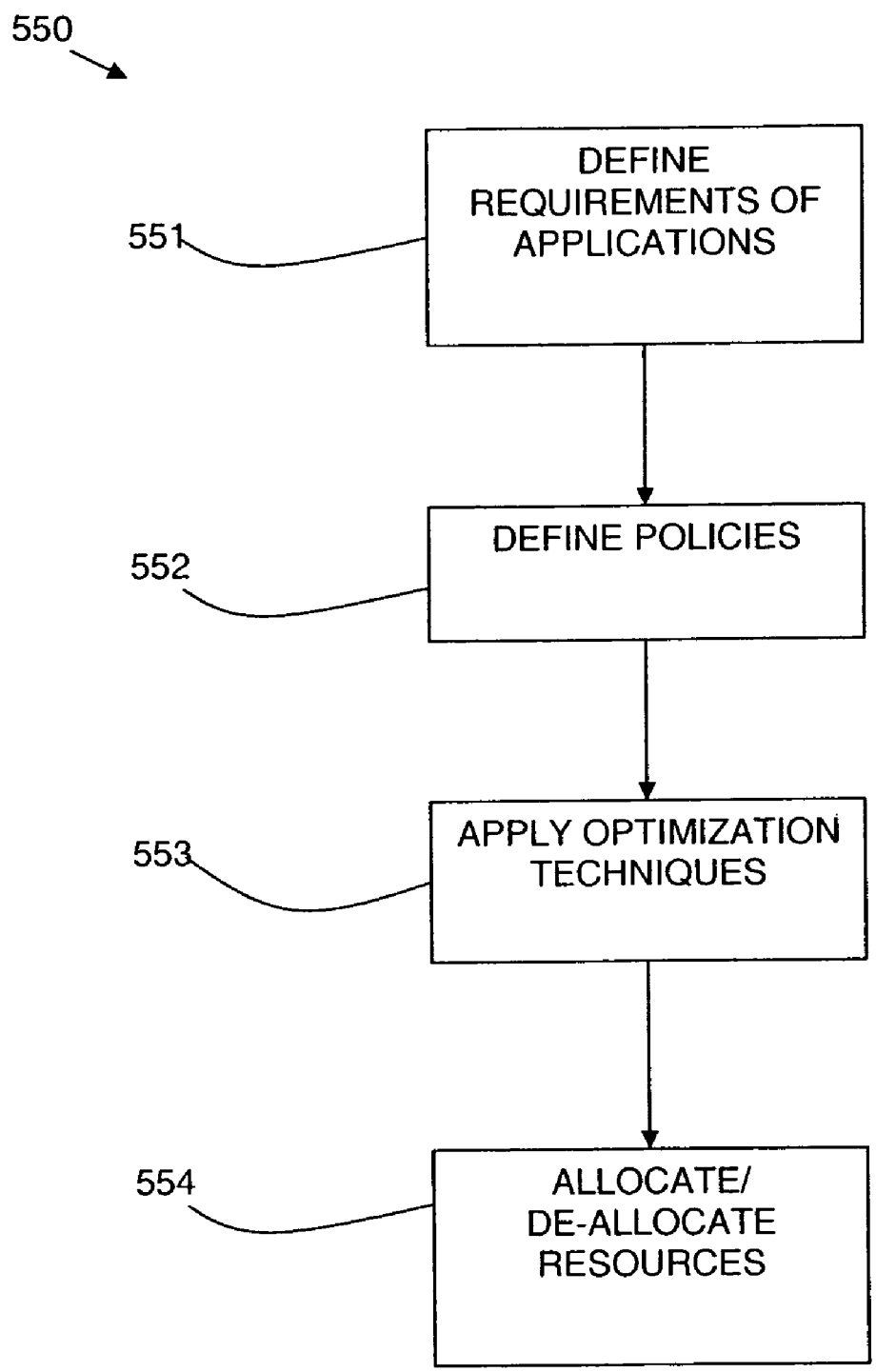
FIG. 5B is a flow diagram of a method of operation of administration of a system-wide search engine.

Referring to FIG. 5B, a flow diagram 550 is provided showing the administration of a search system. Requirements are defined 551 of the plurality of applications pushing data to the search system. Policies are defined 552 regarding resource allocation at predetermined times or in predetermined circumstances. For example, policies may include prioritization of applications and reservation of resources. Optimization techniques are applied 553 to optimize the use of resources of the search system and resources are allocated/de-allocated 554 according to the optimization results.

Referring to FIG. 6A to 6E, an example assuming a simple model is described.

Assume a search index, given 1 Gb of memory can process 1000 documents per minute.

Assume only one type of request from an application is supported of the form:"I intend to process X documents between time a and time b".

Given a request, the index controller checks:

Is X/(b−a) greater than 1000 docs/min. If yes, the index controller warns the administrator telling it how much memory should be added.
The index controller checks how much capacity has been reserved between time a and time b. If there is enough capacity (less than 1000 docs/min in the interval), it is reserved. If not, again, the index controller warns the administrator.

An example is given during one hour. FIGS. 6A-6E show a table 600 in which the y-axis shows the number of documents 601 against the x-axis which shows time 602. The time is divided into columns of 5 minute intervals 603 with document capacity of up to 1000 documents incrementing by 100 document intervals 604.

Figure 6A:
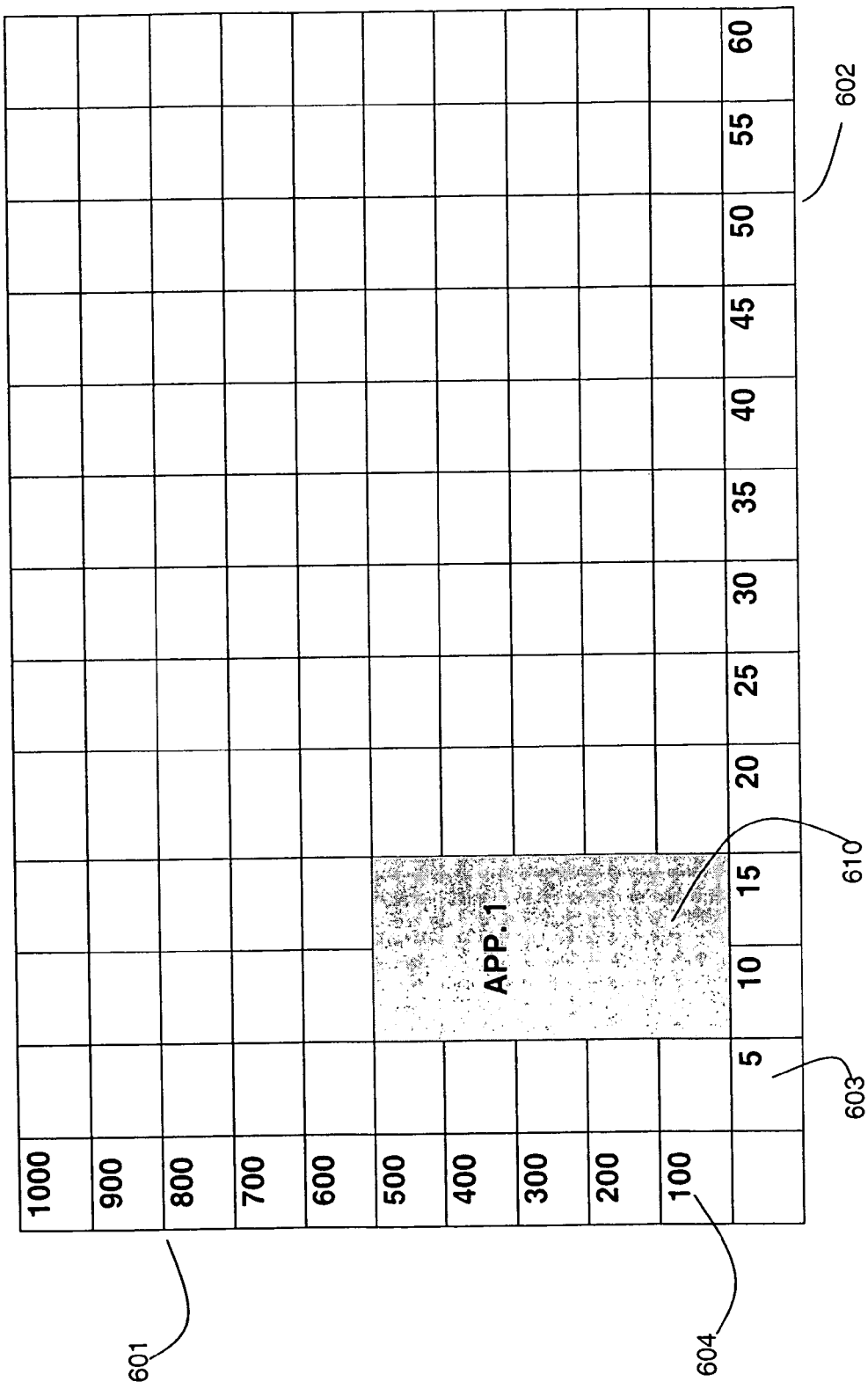

The table starts with an initial capacity and Application 1 requests capacity for 5000 documents between time 5 and 15 minutes. This means 500 documents per minute. There is capacity for this and it is reserved 610 as shown in FIG. 6A.

Figure 6B:
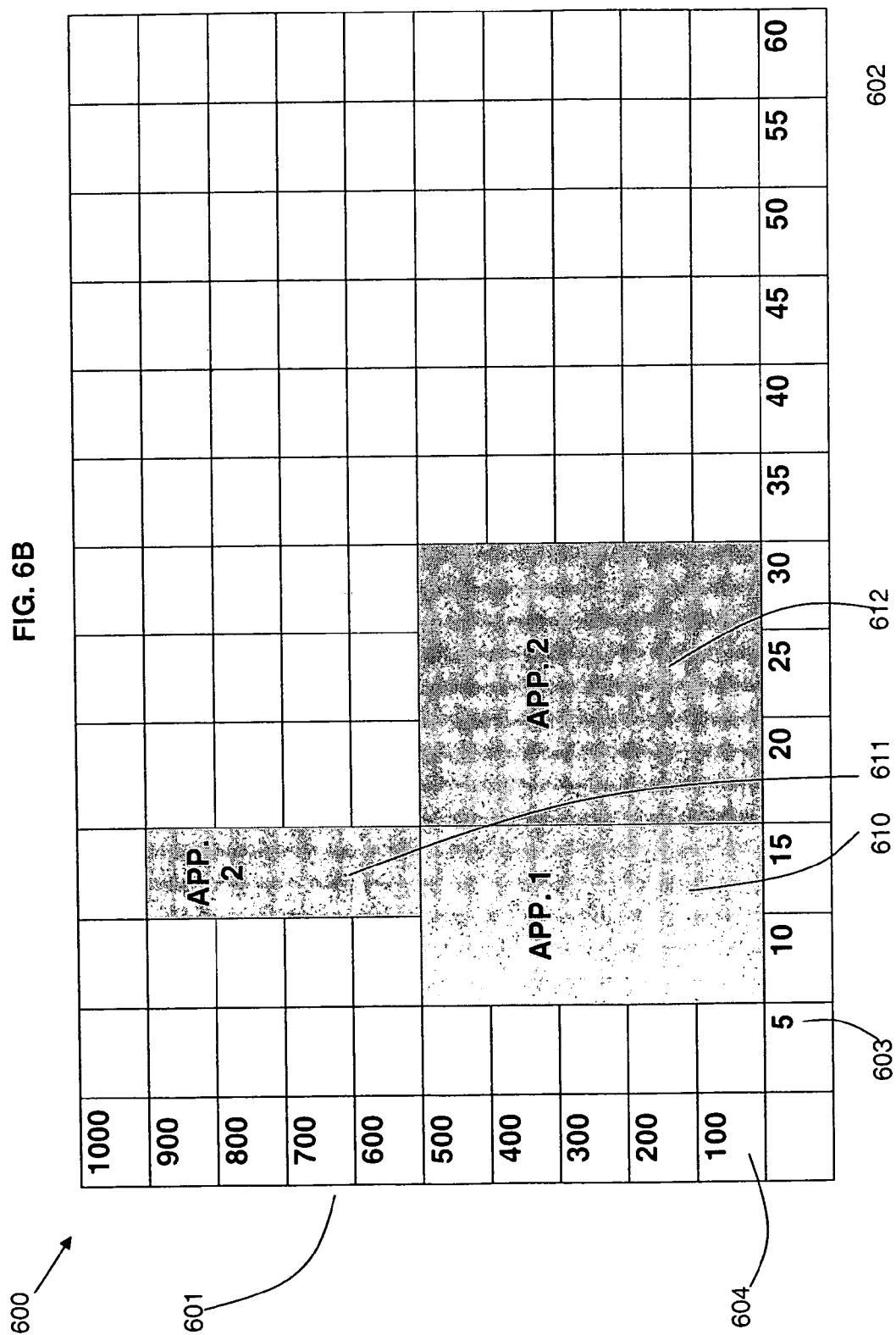

Application 2 then requests capacity for 8000 documents between 10 and 30 minutes. This means 8000/20=400 documents per minute. The table of FIG. 6A is checked and this can be done. FIG. 6B shows the reservations for Application 2 in the form of a first block 611 for the time between 10 and 15 minutes in addition to the block 610 reserved by Application 1, and a second block 612 for the time between 15 and 30 minutes.

Application 3 then requests to insert 1000 documents between time 10 and 15. This means 1000/(15−10)=200 documents per minute in this interval. This cannot be done because there is only a capacity of 100 docs/min left in the 10-15 interval. This is shown in darker shading as block 613 in FIG. 6C. The administrator is informed that for such a request another 100 Mb of memory is required.

Figure 6D:
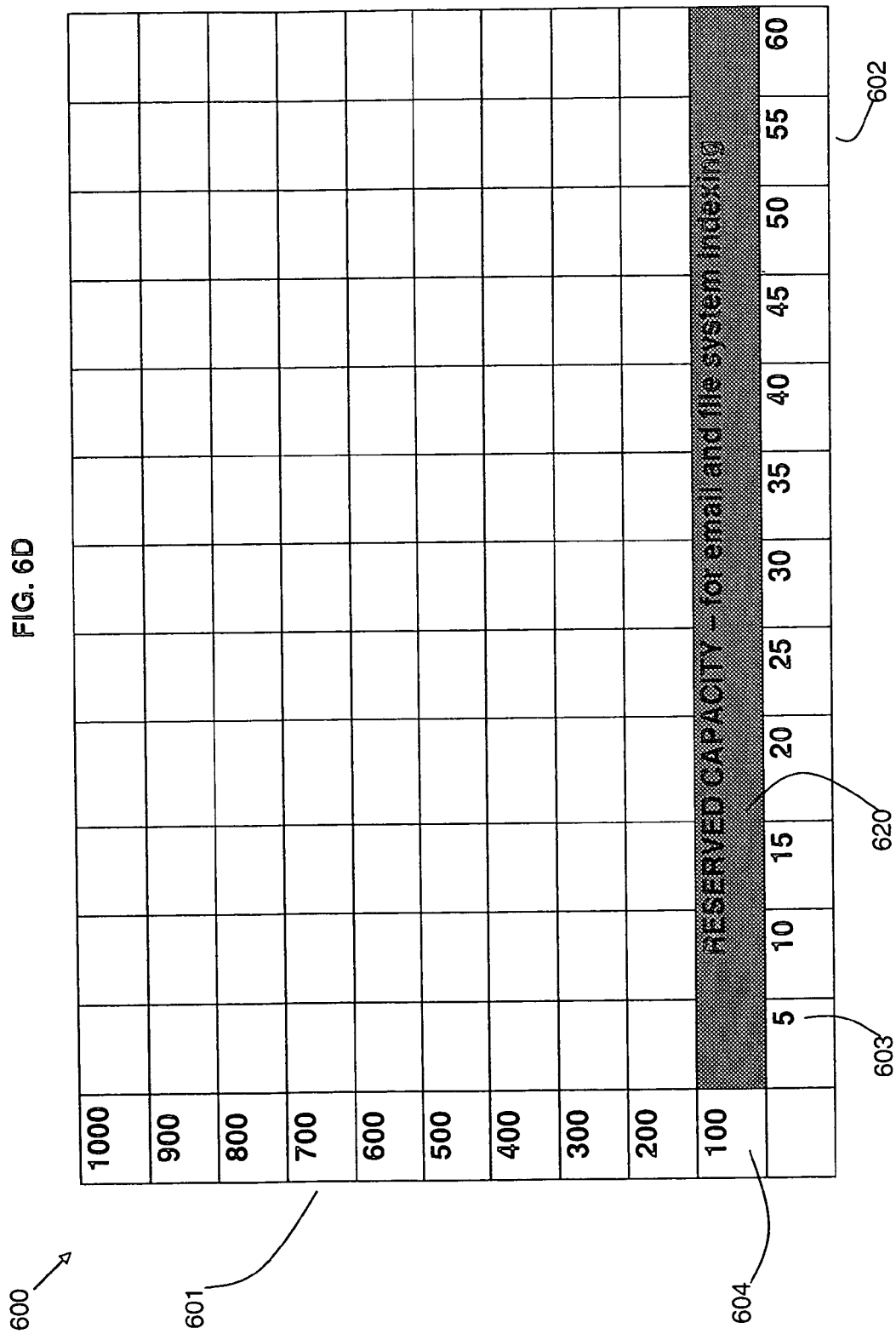
Figure 6E:
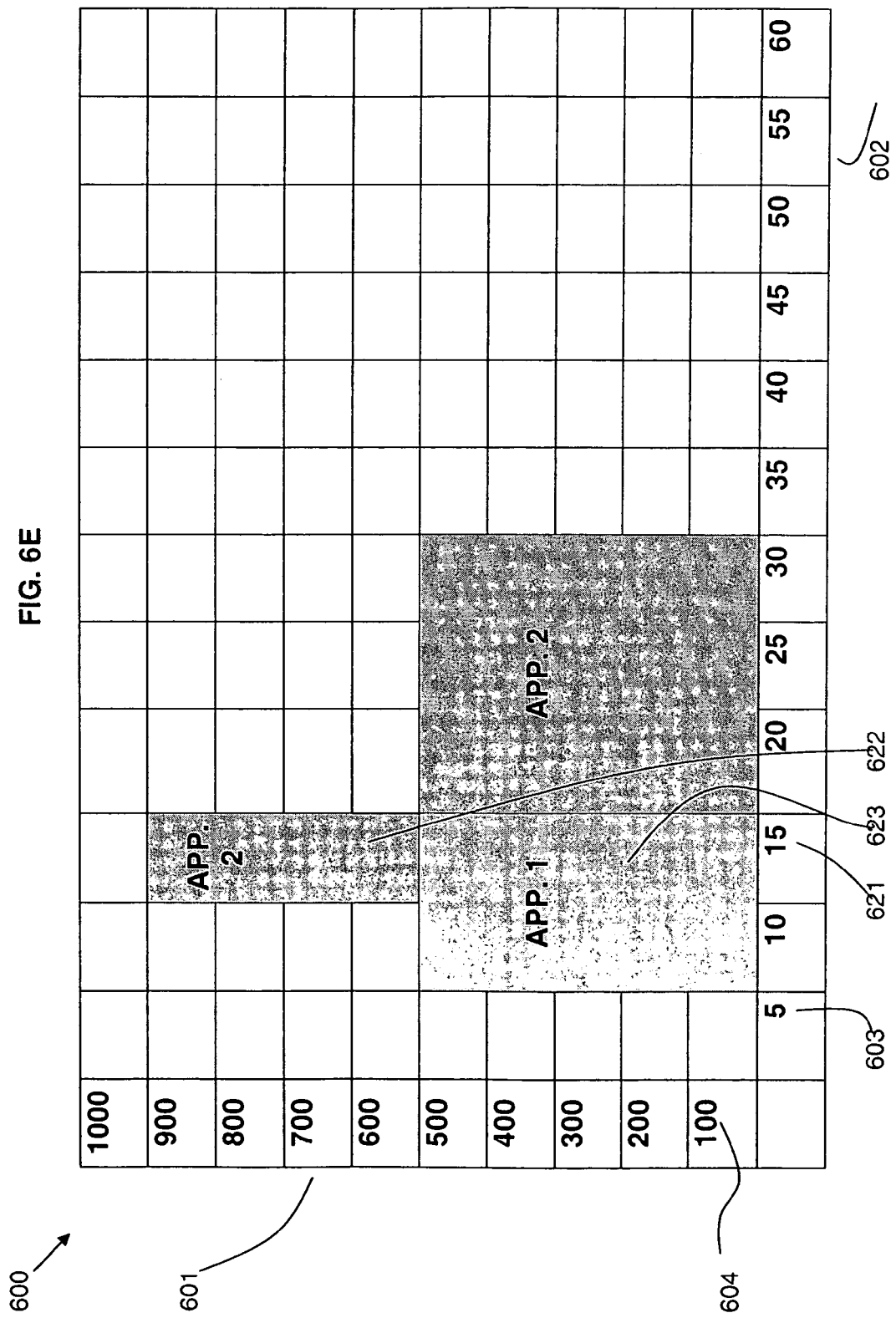

The model can be altered, by allowing applications to reserve some capacity. For example, the administrator can decide always to reserve 50 documents per minute for email indexing purposes and 50 documents per minute for indexing file system activity. This would mean the table is initialized with 100 documents per minute of reserved capacity 620 as shown in FIG. 6D.

This model can be enhanced by adding priorities between the applications that have reservations in a given time slot according to their importance as defined by the administrator. For example, in the table of FIG. 6E, the administrator can decide that in time interval 10-15 621, Application 2 documents 622 have priority over documents of Application 1 623.

From the example above, we have seen how the system can send messages to the administrator requesting more memory (100 Mb in the example). The administrator can decide to allocate this amount of memory for example by increasing the amount of memory available to the indexing application. Another possibility, would be to allocate additional capacity by splitting the processing between two computers.

It has been assumed that an index has a capacity of 1000 docs/min for 1 Gb of memory. To be precise, it should be taken into account the processing power of the CPU and the disk I/O bandwidth and other factors. The simple allocation algorithm presented above can be extended to any number of dimensions. For example, one would be time and the other CPU time. In this case, two tables would need to be maintained: one for memory-capacity/time and the other for CPU-capacity/time.

The management of search services can be brought into the realm of autonomic computing in the form of a system that performs its tasks and adapts to a user's needs without involving the user into the intricacies of its workings. The realization of this requires two types of input:
1) The monitoring of resources used by a system.
2) The ability to know ahead of time what are the requirements of the different users of the system (in this case, the users are the applications that use the search system to make their data searchable).

Given this data, the system can allocate its resources and adapt to user needs.

It is important to note that a more conventional form of quality of service from the point of view of the search user (and not the indexing application) is also possible. In both cases, quality of service for search indexes raises the possibility of a business model for companies hosting search services. A customer may pay according to the level of services requested (both for search users and indexing applications).

For example, a company A can host search services on the behalf of other companies say B-Z. A company B-Z pays company A for the hosting of its searchable data and pays according to the service agreement obtained form company A's search index. The hosting fee would be higher if company B-Z receive higher priority over other companies data or if company B-Z can reserve more processing power.

A resource optimizer alone or as part of a search system may be provided as a service to a customer over a network.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

The invention can take the form of a computer program product accessible from a computer-usable or computer-readable medium providing program code for use by or in connection with a computer or any instruction execution system. For the purposes of this description, a computer usable or computer readable medium can be any apparatus that can contain, store, communicate, propagate, or transport the program for use by or in connection with the instruction execution system, apparatus or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read only memory (ROM), a rigid magnetic disk and an optical disk. Current examples of optical disks include compact disk read only memory (CD-ROM), compact disk read/write (CD-R/W), and DVD.

Improvements and modifications can be made to the foregoing without departing from the scope of the present invention.

We claim:

1. A method for administration of a search system for searching data input from a plurality of applications, the method comprising:
   receiving from a plurality of applications, indications of intent to send data for input into an index stored in storage of a search system at specified times after the indications, wherein the data for input is to be indexed in the search system, and wherein each indication including:
   requirements of an application for acceptable performance parameters of the search system for said data for input; and
   the specified time at which the data for input is intended to be sent;
   adapting the search system based on said requirements by allocating or de-allocating performance resources of the search system to meet the requirements specified in said indications for a plurality of inputs from different applications at the specified times;
   including using Optimization techniques to dynamically allocate or de-allocate said performance resources to meet the applications' requirements, when an indication is received, wherein the optimization techniques are selected from the group including: queuing theory, linear programming, task scheduling; and
   receiving data for input into the index stored in the storage of the search system at the specified times from the plurality of applications.

2. A method as claimed in claim 1, including defining policies regarding resource consumption in predetermined circumstances.

3. A method as claimed in claim 1, including reserving said performance resources for an application prior to the input of said data.

4. A method as claimed in claim 1, including prioritising applications to determine resource availability to the applications.

5. A method as claimed in claim 1, wherein the requirements of the plurality of applications include one or more of: the relative priority of an application, an expected rate of update of the data, the average size of the data and the data type, a maximum excepted delay between sending data for input to the search system and the data being searchable.

6. A method as claimed in claim 1, comprising determining that there are sufficient performance resources to meet an indication of an application, and issuing a specification of the performance parameters available to specify a minimum quality of service the application will receive.

7. A method as claimed in claim 1, including:
   receiving said indications from a plurality of applications in advance of sending data for input into the search system;
   adapting the search system before receiving the data for input; and
   subsequently receiving data for input into the search engine from the plurality of applications.

8. A method as claimed in claim 1, including defining policies regarding resource consumption at predetermined times.

9. A method as claimed in claim 1, including indexing the data received from the plurality of application in the search system.

10. A method of providing a service to a customer over a network for administration of a search system for searching data input from a plurality of applications, the service including the steps of:
    receiving from a plurality of applications, indications of intent to send data for input into an index stored storage of a t-he search system at specified times after the indications, wherein the data for input is to be indexed in the search system, and wherein each indication including:
    requirements of an application for acceptable performance parameters of the search system for said data for input; and the specified time at which the data for input is intended to be sent;

monitoring the performance resources of the search system; and adapting the search system based on said requirements by allocating or de-allocating performance resources of the search system to meet the requirements specified in said indications for a plurality of inputs from different applications at the specified times; and including using Optimization techniques to dynamically allocate or de-allocate said performance resources to meet the applications' requirements, when an indication is received, wherein the optimization techniques are selected from the group including: queuing theory, linear programming, task scheduling.

* * * * *